(12) United States Patent
Lee

(10) Patent No.: US 11,976,591 B2
(45) Date of Patent: May 7, 2024

(54) AIR INLET MANIFOLD AND GAS TURBINE INCLUDING THE SAME

(71) Applicant: DOOSAN ENERBILITY CO., LTD., Changwon-si (KR)

(72) Inventor: Young Do Lee, Changwon-si (KR)

(73) Assignee: DOOSAN ENERBILITY CO., LTD., Changwon-si (KR)

(*) Notice: Subject to any disclaimer, the term of this patent is extended or adjusted under 35 U.S.C. 154(b) by 0 days.

(21) Appl. No.: 18/174,390

(22) Filed: Feb. 24, 2023

(65) Prior Publication Data
US 2023/0272743 A1 Aug. 31, 2023

(30) Foreign Application Priority Data

Feb. 25, 2022 (KR) .................... 10-2022-0024854

(51) Int. Cl.
| | | |
|---|---|---|
| F02C 7/045 | (2006.01) |
| F01D 9/04 | (2006.01) |
| F01D 25/28 | (2006.01) |
| F04D 29/54 | (2006.01) |

(52) U.S. Cl.
CPC .............. F02C 7/045 (2013.01); F01D 9/047 (2013.01); F01D 25/28 (2013.01); F04D 29/54 (2013.01); F04D 29/541 (2013.01); F05D 2260/96 (2013.01)

(58) Field of Classification Search
CPC .......... F02C 7/045; F01D 9/047; F01D 25/28; F04D 29/54; F04D 29/541; F05D 2260/96
See application file for complete search history.

(56) References Cited

U.S. PATENT DOCUMENTS

| | | | | |
|---|---|---|---|---|
| 3,421,446 A | * | 1/1969 | Strscheletzly | ...... F04D 29/4273 415/208.1 |
| 6,099,257 A | * | 8/2000 | Schilling | ............... F04D 29/023 416/241 R |
| 8,206,097 B2 | * | 6/2012 | Nagai | ................... F04D 29/663 415/220 |
| 9,291,068 B2 | * | 3/2016 | Roge | ...................... F16J 15/021 |
| 2002/0131862 A1 | * | 9/2002 | Sheoran | ................. B64D 41/00 415/208.1 |
| 2016/0108930 A1 | * | 4/2016 | Hashimoto | ............. F01D 9/047 415/208.1 |
| 2019/0128190 A1 | * | 5/2019 | Aoyama | .................... F01D 9/06 |

FOREIGN PATENT DOCUMENTS

| | | |
|---|---|---|
| KR | 101692665 B1 | 1/2017 |
| KR | 1020170091750 A | 8/2017 |

* cited by examiner

*Primary Examiner* — Justin D Seabe
*Assistant Examiner* — Aye S Htay
(74) *Attorney, Agent, or Firm* — Shook, Hardy & Bacon L.L.P.

(57) ABSTRACT

An air inlet manifold and a gas turbine including the same, capable of preventing transmission of vibration from the gas turbine to the air inlet manifold, while at the same time preventing air leakage, and the air inlet manifold is installed to be spaced apart from the compressor and relatively movable, as the anti-vibration pad in a compressed state is interposed between the air inlet manifold and the compressor.

16 Claims, 5 Drawing Sheets

AIR INLET MANIFOLD AND GAS TURBINE INCLUDING THE SAME

CROSS REFERENCE TO RELATED APPLICATION

The present application claims priority to Korea Patent Application No. 10-2022-0024854, filed on Feb. 25, 2022, the entire contents of which is incorporated herein for all purposes by this reference.

TECHNICAL FIELD

The present disclosure relates to an air inlet manifold and a gas turbine including the same, and more particularly, to an air inlet manifold that prevents transmission of vibration from the gas turbine to the air inlet manifold and prevents air leakage at the same time and a gas turbine including the same.

BACKGROUND

Korean Patent Application Publication No. 2017-0091750 discloses a compressor 2 and a supercharger 1 provided with an intake silencer 3 connected to the compressor 2. The intake silencer 3 is a device serving as a flow path to convert a flow of intake air from a diametrical direction of the supercharger to an axial direction and send it to an inlet of the compressor 2.

However, there is a problem in that if the intake silencer 3 is directly connected to the compressor 2, it is difficult to avoid resonance from the vibration transmitted from the compressor 2, and if the intake silencer 3 is separated from the compressor 2 to avoid resonance, air leakage may occur.

To this end, in the prior art, while the intake silencer 3 is directly connected to the compressor 2, cement is thickly placed on a wall of the intake silencer 3 to increase rigidity, but this is easily broken by vibration and has poor workability and the cost gets high.

SUMMARY

The present disclosure aims to provide an air inlet manifold capable of preventing transmission of vibration from a gas turbine to the air inlet manifold and preventing air leakage at the same time, and a gas turbine including the same.

The technical problem to be achieved by the present disclosure is not limited to the above-mentioned technical problem, and other technical problems that are not mentioned will be clearly understood by ordinary-skilled persons in the art to which the present disclosure pertains from the following description.

One embodiment is an air inlet manifold connected to a compressor, the compressor having an inner casing and an outer casing between which an air flow path being formed, and the air inlet manifold guiding air to the compressor, including: a front plate; a rear plate spaced apart from the front plate in an axial direction and having a discharge opening allowing the outer casing to be disposed on an inside thereof; a side plate connecting a circumference of the front plate and a circumference of the rear plate while forming a suction opening; a guide pipe extending from the front plate to have a decreasing diameter toward the rear plate and having an end on a side of the rear plate facing the inner casing; a first anti-vibration pad provided in a compressed state between the rear plate and the outer casing; and a second anti-vibration pad provided in a compressed state between the guide pipe and the inner casing.

According to the embodiment, the first anti-vibration pad may be compressed in a radial direction.

According to the embodiment, a diameter of the discharge opening may be formed greater than a diameter of an end of the outer casing and smaller than a sum of the diameter of the end of the outer casing and a radial thickness of the first anti-vibration pad before compression.

According to the embodiment, the first anti-vibration pad has an L-shaped cross-sectional shape and is disposed on an edge of the outer casing.

According to the embodiment, the first anti-vibration pad may be fixed to one among the rear plate and the outer casing.

According to the embodiment, the second anti-vibration pad may be compressed in an axial direction.

According to the embodiment, an axial distance between the guide pipe and the inner casing may be formed smaller than an axial thickness of the second anti-vibration pad before compression.

According to the embodiment, the second anti-vibration pad may be disposed in a groove formed at an end on a side of the rear plate, and an axial depth of the groove may be formed smaller than the axial thickness of the second anti-vibration pad before compression.

According to the embodiment, the second anti-vibration pad may be fixed to one among the guide pipe and the inner casing.

According to the embodiment, the first anti-vibration pad and the second anti-vibration pad may be made of a polyurethane material.

According to the embodiment, the first anti-vibration pad may have greater rigidity than the second anti-vibration pad.

According to the embodiment, the air inlet manifold may further include: a support part for supporting a main body composed of the front plate, the rear plate, and the side plate, and the support part may move the main body up, down, left, and right along a radial direction.

Another embodiment is a gas turbine, including: the air inlet manifold; a compressor compressing air guided by the air inlet manifold to a high pressure; a combustor mixing air compressed by the compressor with fuel and combusting a mixture of the air and the fuel; and a turbine generating power by rotating turbine blades using high-temperature, high-pressure combustion gas discharged from the combustor.

According to the present disclosure, the air inlet manifold is movable relatively in a spaced-apart state in which the air inlet manifold is not directly connected to the compressor, and since an anti-vibration pad is installed between the air inlet manifold and the compressor in a compressed state, air leakage is prevented and at the same time, dust is prevented.

In addition, a simple structure of the anti-vibration pad may increase workability and reduce manufacturing costs.

The effects of the present disclosure are not limited to the above effects, and should be understood to include all effects that can be deduced from the configuration of the invention described in the detailed description or claims of the present disclosure.

DETAILED DESCRIPTION

Figure 1:
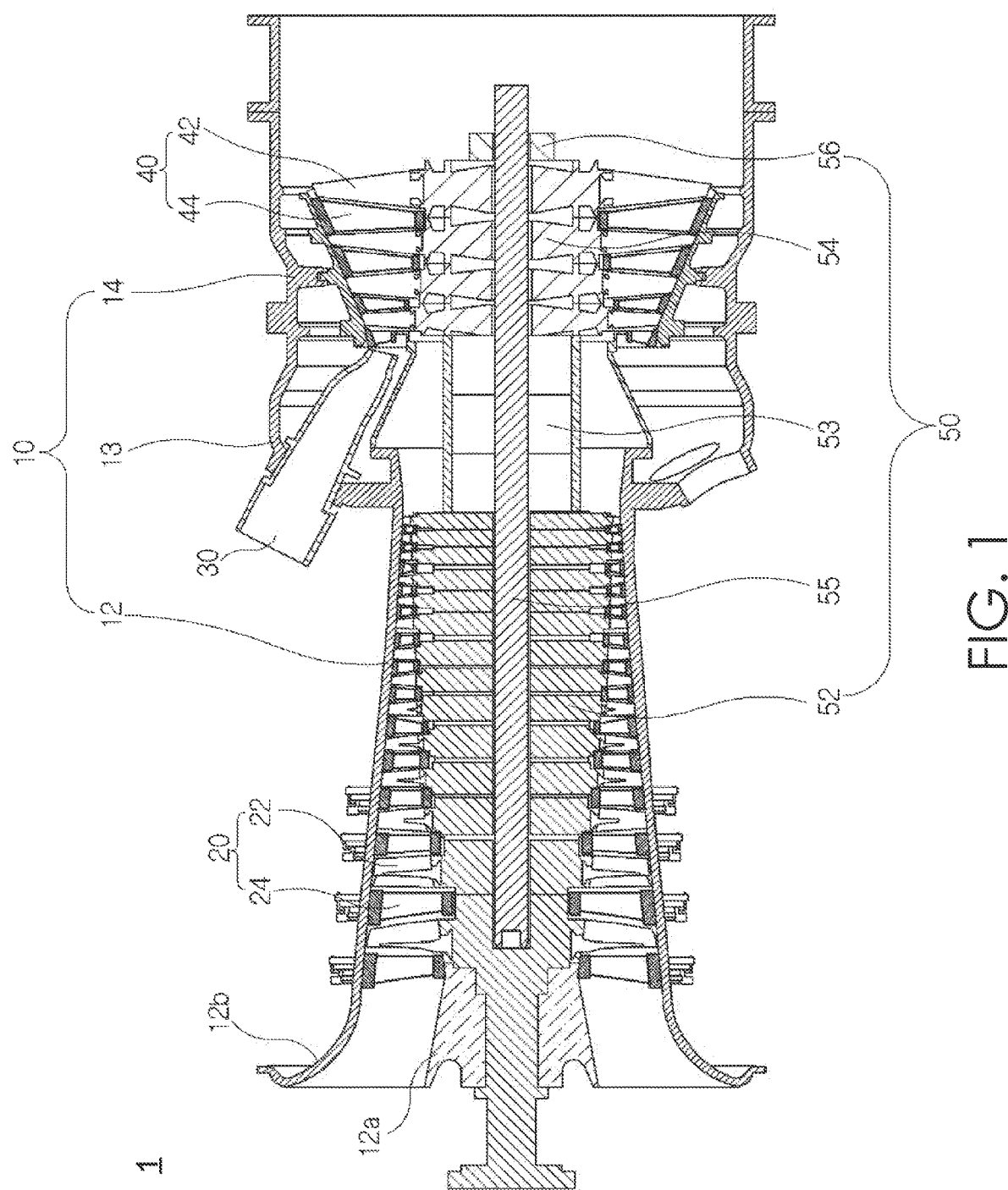
FIG. 1 is a cross-sectional view illustrating a gas turbine according to an embodiment of the present disclosure.

Hereinafter, a preferred embodiment of an air inlet manifold and gas turbine including the same according to the present disclosure will be described with reference to the accompanying drawings.

In addition, terms used herein are defined in consideration of functions in the present disclosure, and may vary according to user's or operator's intention or practices, and the following embodiments do not limit the scope of the present disclosure, but are merely examples of the components presented in the claims.

For clear illustration, components that are irrelevant to the description are omitted, and like reference numerals refer to like components throughout the specification. In the description, when an element "includes" a certain component, it means that the element may further include other components, rather than excluding them, unless specifically stated otherwise.

Hereinafter, a gas turbine 1 according to an embodiment of the present disclosure will be described with reference to FIG. 1.

The gas turbine 1 generally includes a casing 10, a compressor 20 that sucks and compresses air at a high pressure, a combustor 30 that mixes the compressed air compressed by the compressor 20 with fuel to combust an air-fuel mixture, and a turbine 40 that obtains a rotational force by the combustion gas transmitted from the combustor 30 to generate electric power.

The casing 10 includes a compressor casing 12 in which the compressor 20 is accommodated, a combustor casing 13 in which the combustor 30 is accommodated, and a turbine casing 14 in which the turbine 40 is accommodated. Here, the compressor casing 12, the combustor casing 13, and the turbine casing 14 may be sequentially arranged from the upstream side to the downstream side in a direction of fluid flow.

Inside the casing 10, a rotor 50 (central axis) is provided to be rotatable by a bearing, and a generator (not shown) is interlocked with the rotor 50 for power generation. The rotor 50 may include a compressor rotor disk 52 accommodated in the compressor casing 12, a turbine rotor disk 54 accommodated in the turbine casing 14, a torque tube 53 accommodated in the combustor casing 13 to connect the compressor rotor disk 52 and the turbine rotor disk 54. The rotor 50 may further include a tie rod 55 and a fastening nut 56 coupling the compressor rotor disk 52, the torque tube 53 and the turbine rotor disk 54.

The compressor 20 may include a compressor blade 22 coupled to the compressor rotor disk 52 and rotated along with the rotor 50 and a compressor vane 24 mounted on the compressor casing 12 to align an air flow flowing into the compressor blade 22. The compressor blade 22 may consist of a plurality of compressor blades, which may be formed in multiple stages along the axial direction of the rotor 50, wherein the compressor blades 22 may be arranged radially along the rotation direction of the rotor 50 for respective stages. Likewise, the compressor vane 24 may consist of a plurality of compressor vanes, which may be formed in multiple stages along the axial direction of the rotor 50, wherein the plurality of compressor vanes may be arranged radially along the rotation direction of the rotor 50 for respective stages. Here, the compressor vanes 24 and the compressor blades 22 may be alternately arranged along a flow direction of air.

At this time, the compressor casing 12 includes an inner casing 12a and an outer casing 12b that form an air flow path P through which air is introduced at an inlet of the compressor. The tubular inner casing 12a may cover one side of the compressor rotor disk 52 in an axial direction, and the outer casing 12b may surround the entire compressor rotor disk 52. Due to this, an annular air flow path P is formed between an inner surface of the outer casing 12b and an outer surface of the inner casing 12a, and air is introduced through the air flow path P to flow to the compressor vanes 24 and the compressor blades 22. An air inlet manifold for guiding air to the air flow path P is installed at the inlet of the compressor, which will be discussed in more detail below.

The combustor 30 mixes the air introduced from the compressor 20 with fuel and combusts a fuel-air mixture to produce a high-temperature and high-pressure combustion gas, and the combustor 30 may be formed to increase the combustion gas temperature to the limit of heat resistance that the combustor and turbine can withstand in an isobaric combustion process. The combustor 30 may consist of a plurality of combustors, which may be arranged along the rotational direction of the rotor 50 around the combustor casing. At this time, each of the combustors 30 includes a liner into which air compressed in the compressor 20 flows, and a transition piece disposed on the rear side of the liner to guide the combustion gas to the turbine 40.

The turbine 40 may be formed similar to the compressor 20. The turbine 40 may include a turbine blade 42 coupled to the turbine rotor disk 54 and rotated together with the rotor 50, and a turbine vane 44 fixed to the turbine casing 14 to align a flow of air flowing into the turbine blade 42. The turbine blade 42 may consist of a plurality of the turbine blades, which may be arranged in multiple stages along the axial direction of the rotor 50, and the plurality of turbine blades 42 may be radially formed for each stage along the rotation direction of the rotor 50. Likewise, the turbine vane 44 may consist of a plurality of turbine vanes, which may be formed in multiple stages along the axial direction of the rotor 50, and the plurality of turbine vanes 44 may be radially formed for each stage along the rotation direction of the rotor 50. Here, the turbine vanes 44 and the turbine blades 42 may be alternately arranged along a flow direction of air.

Here, unlike the compressor 20, the turbine 40 is in contact with a high-temperature and high-pressure combustion gas, so that the turbine requires a cooling element for preventing damage such as deterioration. To this end, the gas turbine according to the present embodiment may further include a cooling path through which compressed air is additionally supplied from a portion of the compressor 20 to the turbine 40.

Here, the gas turbine is merely an embodiment of the present disclosure, and the air inlet manifold of the present disclosure, which will be described in detail below, can be widely applied not only to a land-based gas turbine, but also to a jet engine in which air and fuel are combusted.

Next, the air inlet manifold connected to the compressor 20 and guiding air to the compressor 20, specifically, to the air path P will be described in detail with reference to FIGS. 2 to 6.

The air inlet manifold according to the embodiment of the present disclosure includes a main body 100 composed of a front plate 120, a rear plate 140, a side plate 160 and a guide pipe 180, a first anti-vibration pad 200, a second anti-vibration pad 300, and a support part 400.

Figure 3:
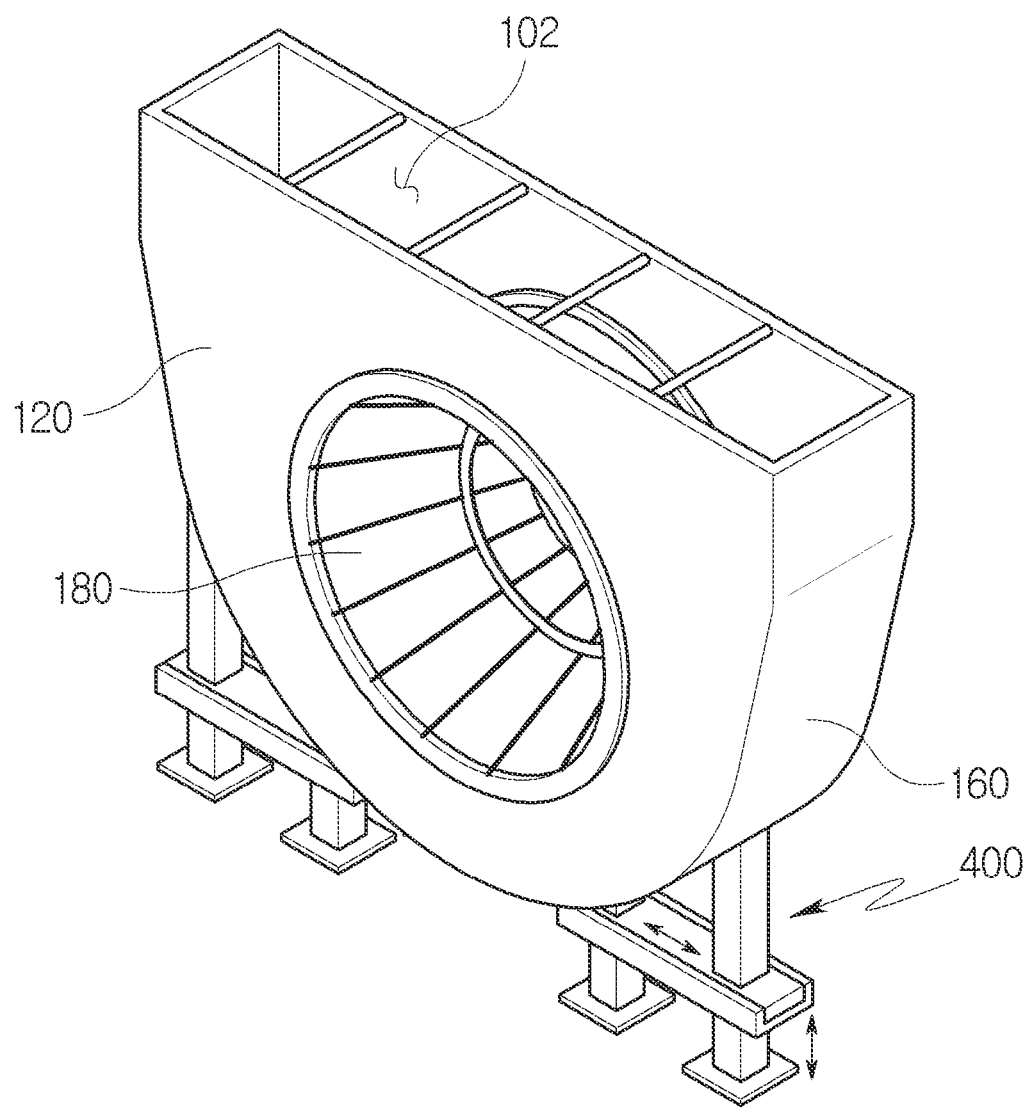
FIG. 3 is a perspective view of one side of the air inlet manifold of FIG. 2.
Figure 4:
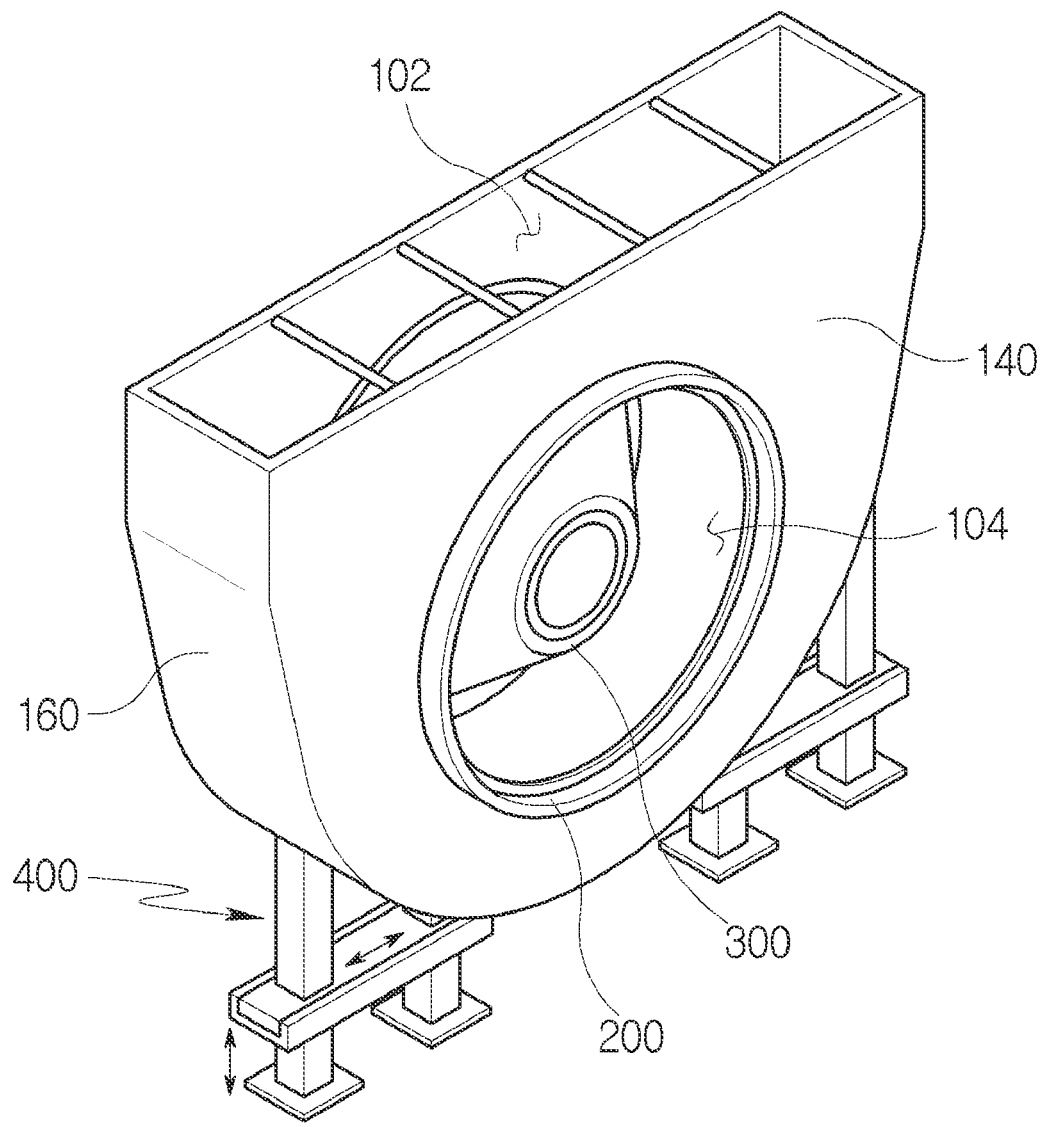
FIG. 4 is a perspective view of the other side of the air inlet manifold of FIG. 2.

The front plate 120 and the rear plate 140 are spaced apart from each other in an axial direction and are preferably formed in the same shape. For example, as illustrated in FIGS. 3 and 4, the front plate 120 and the rear plate 140 may be formed round to have a width that increases from a lower side (the ground side) toward an upper side in the figure.

The rear plate 140 is provided with a discharge opening 104 in which the outer casing 12b of the compressor is disposed inside. That is, a surface of the rear plate 140 forming the discharge opening 104 may face an end on the inlet side of the outer casing 12b.

Figure 2:
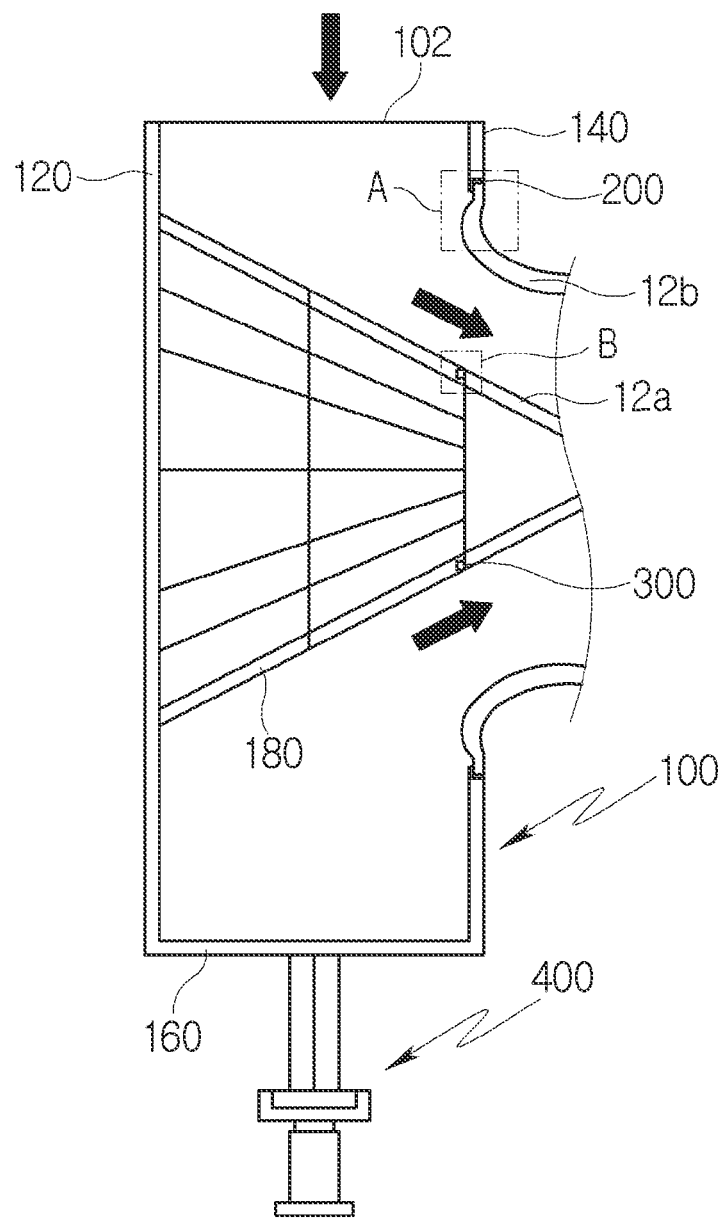
FIG. 2 is a cross-sectional view illustrating an air inlet manifold according to an embodiment of the present disclosure installed in a compressor inlet of the gas turbine of FIG. 1.

The side plate 160 connects a circumference of the front plate 120 and a circumference of the rear plate 140 while forming a suction opening 102. To this end, the side plate 160 may connect only a portion of the circumference of the front plate 120 and only a portion of the circumference of the rear plate 140, and a portion that is not connected may become the suction opening 102. In this embodiment, as illustrated in FIGS. 2 and 3, the side plate 160 does not connect a circumference of the front plate 120 and a circumference of the rear plate 140 on an upper side thereof so as to form the suction opening 102 on an upper side in the figure. However, it is not limited thereto, and the suction opening 102 may be formed on a lower side in the figure.

The guide pipe 180 extends from the front plate 120 toward the rear plate 140 so as to have a smaller diameter, and has a truncated cone shape. A diameter of an end on the rear plate 140 side of the guide pipe 180 is formed to be substantially the same as a diameter of an end on the inlet side of the inner casing 12a, such that the end on the rear plate 140 side of the guide pipe 180 faces the inner casing 12a. Moreover, it is preferable that an inclination of the guide pipe 180 is formed to be the same as that of the inner casing 12a, and it is preferable that a diameter of an end on the front plate 120 side of the guide pipe 180 is formed to be similar to the end on the inlet side of the outer casing 12b.

As the main body 100 is formed as described above, the air sucked into the main body 100 in a radial direction through the suction opening 102 is guided to change a direction to an axial direction by the guide pipe 180. After that, the air may be guided to the air flow path P of the compressor through the discharge opening 104.

In the present disclosure, to prevent transmission of vibration from the gas turbine 1, the air inlet manifold is not directly connected to the gas turbine 1 in a fixed state. That is, the air inlet manifold is spaced apart from the compressor 20 of the gas turbine by interposing the anti-vibration pad in a compressed state, and is installed in a relatively movable state. In this case, even if the air inlet manifold is installed to be spaced apart from the compressor 20, air leakage does not occur because a compressed anti-vibration pad is provided therebetween.

Specifically, the first anti-vibration pad 200 is provided in a compressed state between the rear plate 140 and the outer casing 12b, and the second anti-vibration pad 300 is provided in a compressed state between the guide pipe 180 and the inner casing 12a. The first anti-vibration pad 200 and the second anti-vibration pad 300 are formed in an annular ring shape to prevent air leakage along the entire circumference.

As described above, since a radial surface forming the discharge opening 104 in the rear plate 140 faces the end on the inlet side of the outer casing 12b, a radially inner surface of the first anti-vibration pad 200 comes into contact with the outer casing 12b, and a radially outer surface comes into contact with the rear plate 140. The first anti-vibration pad 200 is radially compressed between the rear plate 140 and the outer casing 12b. To this end, a diameter of the discharge opening 104 should be formed greater than a diameter of the end on the inlet side of the outer casing 12b, but smaller than a value obtained by adding a diameter of the end on the inlet side of the outer casing 12b to a radial thickness of the first anti-vibration pad 200 before compression.

Figure 5:
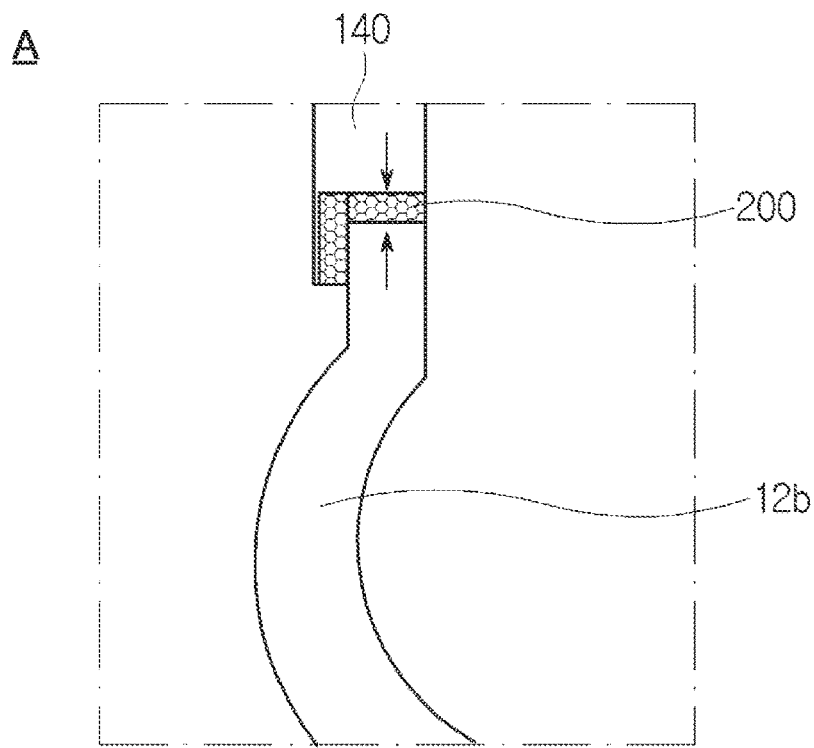
FIG. 5 is an enlarged view of part A of FIG. 2.

In this embodiment, as shown in FIG. 5, the first anti-vibration pad 200 has an L-shaped cross-sectional shape and is disposed on an edge of the outer casing 12b. Since the first anti-vibration pad 200 is compressed in a radial direction, a portion extending horizontally (axially) from the first anti-vibration pad 200 is compressed. For example, the radial thickness of the first anti-vibration pad 200 may be compressed from 25 mm to 21 mm. On the other hand, a portion extending vertically (radially) from the first anti-vibration pad 200 is not compressed.

In this embodiment, the first anti-vibration pad 200 is fixed to the rear plate 140 by bonding and is seated on an edge of the outer casing 12b without fixation, but is not limited thereto. In other aspects, the first anti-vibration pad 200 may be fixed to the outer casing 12b.

In addition, as described above, since an axial surface of the end on the rear plate 140 side of the guide pipe 180 faces the end on the inlet side of the inner casing 12a, an axially front surface of the second anti-vibration pad 300 comes into contact with the guide pipe 180, and an axially rear surface of the second anti-vibration pad 300 comes into contact with the inner casing 12a. At this time, the second anti-vibration pad 300 is compressed in an axial direction between the guide pipe 180 and the inner casing 12a. To this end, an axial distance between the guide pipe 180 and the inner casing 12a should be smaller than an axial thickness of the second anti-vibration pad 300 before compression.

Figure 6:
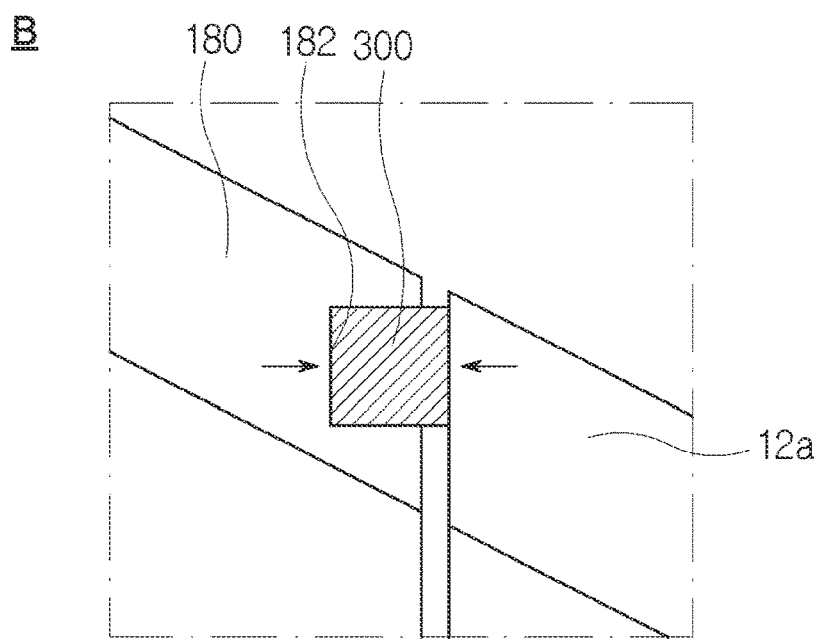
FIG. 6 is an enlarged view of part B of FIG. 2.

In this embodiment, as shown in FIG. 6, the second anti-vibration pad 300 is disposed in a groove 182 formed at the end on the rear plate 140 side of the guide pipe 180. An axial depth of the groove 182 is smaller than the axial thickness of the second anti-vibration pad 300 before compression, and because of this, when the air inlet manifold is installed at an inlet of the compressor 20, the second anti-vibration pad 300 protruding outward from the groove 182 may be compressed in an axial direction. For example, the axial thickness of the second anti-vibration pad 300 may be compressed from 27.5 mm to 21 mm. As shown exaggeratedly in the figure, it is preferred that some axial distance (e.g., 3 mm) should exist between the guide pipe 180 and the inner casing 12a as the second anti-vibration pad 300 is compressed in the axial direction, even after the installation of the air inlet manifold.

In this embodiment, the second anti-vibration pad 300 is fixed in the groove 182 of the guide pipe by bonding and adheres to the inner casing 12a without fixation, but is not limited thereto. In other aspects, the second anti-vibration pad 300 may be fixed to the inner casing 12a.

The first anti-vibration pad 200 and the second anti-vibration pad 300 may be made of a polyurethane material.

For example, the first anti-vibration pad 200 may be made of Sylodyn-NB, and the second anti-vibration pad 300 may be made of Sylomer-SR28.

Also, depending on the embodiment, the first anti-vibration pad 200 may have greater rigidity than the second anti-vibration pad 300. As a result, an extent to which the second anti-vibration pad 300 is axially compressed by force becomes greater than an extent to which the first anti-vibration pad 100 is radially compressed by the same force applied to the axial compression. This is because the axial rigidity of the air inlet manifold is not relatively high, and if the rigidity of the second anti-vibration pad 300 is high, the second anti-vibration pad may not be compressed as much as desired, but rather, there is a risk that the air inlet manifold may be deformed.

Moreover, the support part 400 supports the main body 100 and may move the main body 100 up, down, left and right along a radial direction. To this end, the support part 400 may include an actuator to vertically (up and down) move the main body 100 and a linear motor and the like to horizontally (left and right) move the main body 100. In this way, when the support part 400 is moved up, down, left, and right, an extent to which the first anti-vibration pad 200 is radially compressed may be uniformly adjusted over the circumference. For example, when a radial thickness compressed on one side of the first anti-vibration pad 200 is greater than a radial thickness compressed on the other side of the first anti-vibration pad 200, an extent of the compression when the main body 100 is moved from one side to the other side may be uniformly adjusted.

According to the present disclosure, since the air inlet manifold is not directly connected to the compressor, the air inlet manifold is relatively movable in a state spaced apart from the compressor, but since the anti-vibration pad is installed between the air inlet manifold and the compressor in a compressed state, it is possible to prevent air leakage while at the same time, prevent dust.

In addition, a simple structure of the anti-vibration pad may increase workability and reduce manufacturing costs.

The present disclosure is not limited to the above-described specific embodiments and descriptions, and a person having ordinary skill in the art to which the present disclosure pertains may modify the present disclosure in various ways without departing from the gist of the present disclosure in the claims. Such modification is within the protective scope of the present disclosure.

What is claimed is:

1. An air inlet manifold coupled to a compressor, the compressor having an inner casing and an outer casing between which an air flow path is formed, and the air inlet manifold configured for guiding air to the compressor, the air inlet manifold comprising:
   a front plate;
   a rear plate spaced apart from the front plate in an axial direction, the rear plate having a discharge opening configured to couple with the outer casing;
   a side plate extending between the front plate and the rear plate along a circumference of the front plate and a circumference of the rear plate,
   a suction opening having a perimeter defined in part by the front plate, the side plate, and the rear plate;
   a guide pipe extending from the front plate toward the rear plate, the guide pipe having a decreasing diameter in the axial direction toward the rear plate and having an end on a side of the rear plate facing the inner casing;
   a first anti-vibration pad provided in a compressed state and positioned between the rear plate and the outer casing; and
   a second anti-vibration pad provided in a compressed state and positioned between the guide pipe and the inner casing; and
   wherein the first and second anti-vibration pads are maintained in compression.

2. The air inlet manifold of claim 1, wherein the first anti-vibration pad is compressed in a radial direction.

3. The air inlet manifold of claim 2, wherein a diameter of the discharge opening is formed greater than a diameter of an end of the outer casing and smaller than a sum of the diameter of the end of the outer casing and a radial thickness of the first anti-vibration pad before compression.

4. The air inlet manifold of claim 1, wherein the first anti-vibration pad has an L-shaped cross-sectional shape and is disposed on an edge of the outer casing.

5. The air inlet manifold of claim 1, wherein the first anti-vibration pad is fixed to one of the rear plate and the outer casing.

6. The air inlet manifold of claim 1, wherein the second anti-vibration pad is compressed in an axial direction.

7. The air inlet manifold of claim 6, wherein an axial distance between the guide pipe and the inner casing is formed smaller than an axial thickness of the second anti-vibration pad before compression.

8. The air inlet manifold of claim 7, wherein the second anti-vibration pad is disposed in a groove formed at the end on a side of the rear plate facing the inner casing, and an axial depth of the groove is formed smaller than the axial thickness of the second anti-vibration pad before compression.

9. The air inlet manifold of claim 1, wherein the second anti-vibration pad is fixed to one of the guide pipe and the inner casing.

10. The air inlet manifold of claim 1, wherein the first anti-vibration pad and the second anti-vibration pad are made of a polyurethane material.

11. The air inlet manifold of claim 1, wherein the first anti-vibration pad has greater rigidity than the second anti-vibration pad.

12. The air inlet manifold of claim 1, further comprising:
   a support part configured for supporting the front plate, the rear plate, and the side plate above a surface,
   wherein the support part is configured to move each of the front plate, the rear plate, and the side plate up, down, left, and right along a radial direction.

13. The air inlet manifold of claim 1, wherein widths of the front plate and the rear plate increase from a bottom portion to an upper portion.

14. The air inlet manifold of claim 13, wherein the suction opening is formed on the upper portion.

15. The air inlet manifold of claim 1, wherein the first anti-vibration pad and the second anti-vibration pad are formed in a ring shape and disposed along entire circumferences of the outer casing and the inner casing, respectively.

16. A gas turbine, comprising:
   a compressor having an inner casing and an outer casing between which an air flow path is formed, the compressor configured to compress air to a high pressure;
   an air inlet manifold coupled to the compressor for guiding air to the compressor;
   a combustor configured to mix air compressed by the compressor with fuel and combust a mixture of the air and the fuel; and a turbine configured to generate mechanical energy from the high-temperature, high-pressure combustion gas discharged from the combustor, wherein the air inlet manifold comprises:

a front plate having a circumference comprising a first part and a second part;

a rear plate having a circumference comprising a third part and a fourth part, the rear plate spaced apart from the front plate in an axial direction, and the rear plate having a discharge opening;

a side plate connecting the first part of the circumference of the front plate and the third part of the circumference of the rear plate, the second part of the circumference of the front plate and the fourth part of the circumference of the rear plate forming a suction opening;

a guide pipe extending from the front plate toward the rear plate, the guide pipe having a decreasing diameter in the axial direction toward the rear plate and having an end on a side of the rear plate facing the inner casing;

a first anti-vibration pad provided in a compressed state and positioned between the rear plate and the outer casing;

a second anti-vibration pad provided in a compressed state and positioned between the guide pipe and the inner casing; and wherein the first and second anti-vibration pads are maintained in compression.

* * * * *